June 17, 1941.  E. BAGNALL  2,245,848
PROTECTIVE DEVICE FOR AUTOMOTIVE VEHICLES
Filed Sept. 23, 1938  2 Sheets-Sheet 2
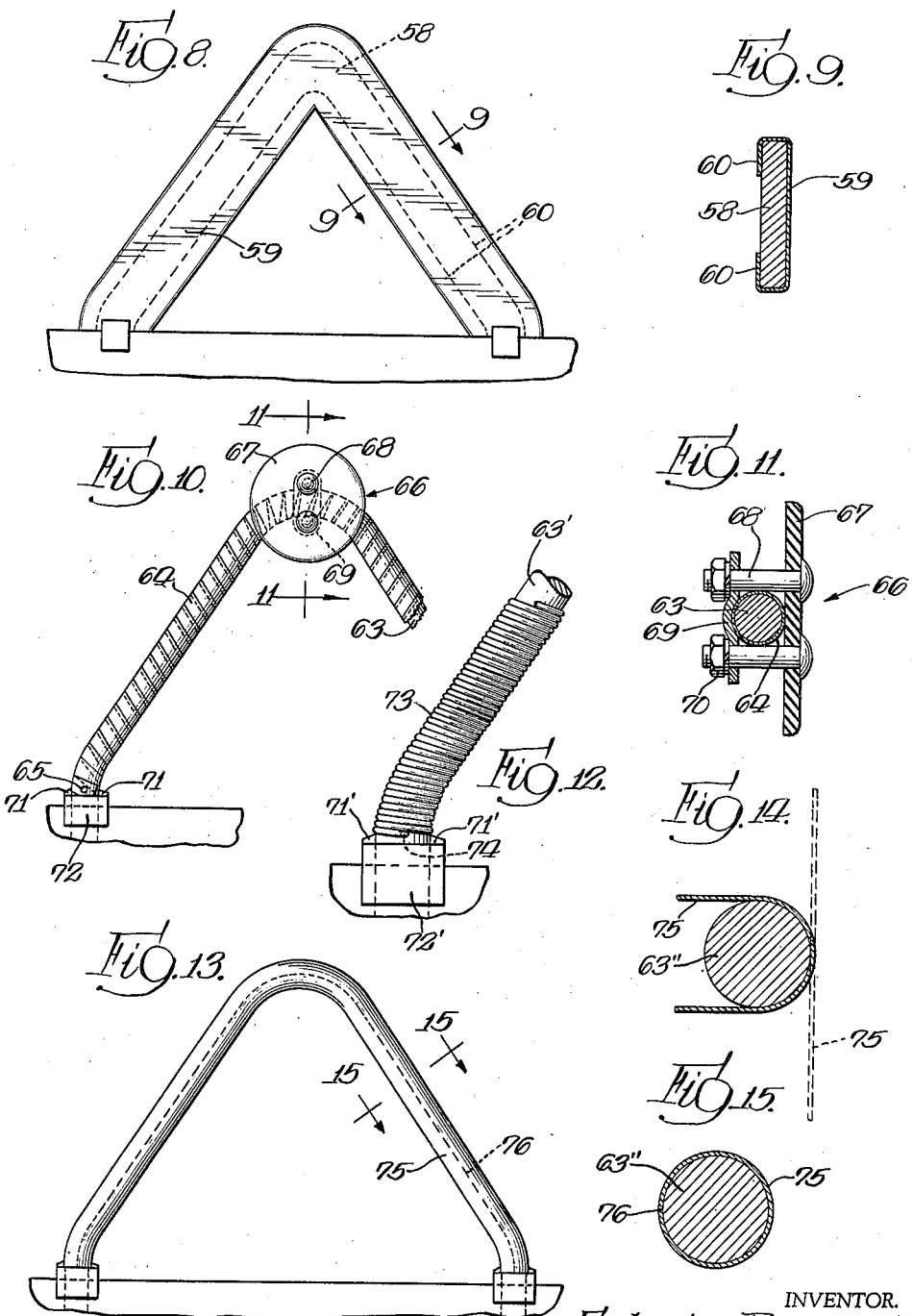
INVENTOR.
Edwin Bagnall,
BY Ernest A. Wegner
ATTORNEY.

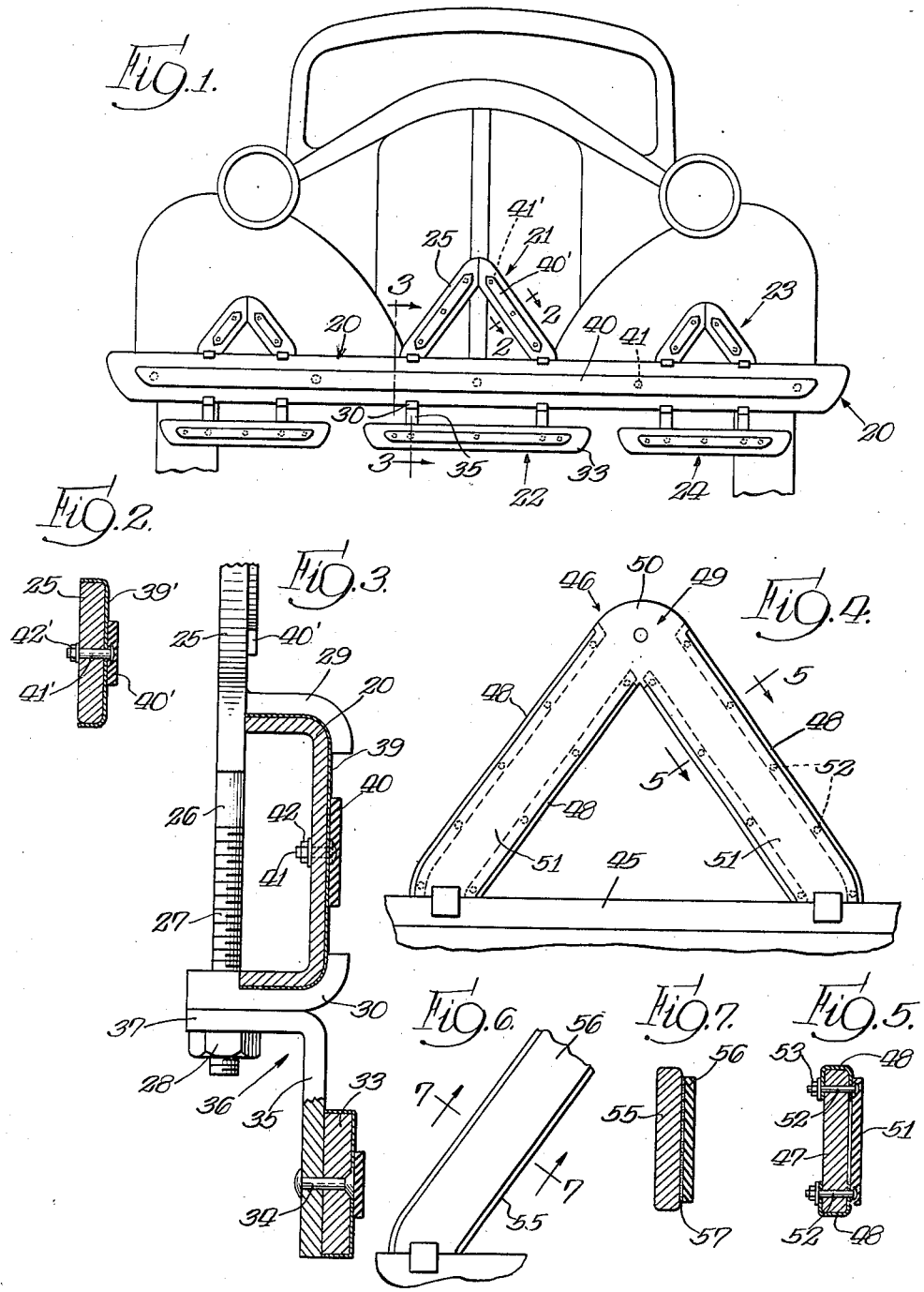

Patented June 17, 1941

2,245,848

UNITED STATES PATENT OFFICE 2,245,848

PROTECTIVE DEVICE FOR AUTOMOTIVE VEHICLES

Edwin Bagnall, Chicago, Ill.

Application September 23, 1938, Serial No. 231,405

7 Claims. (Cl. 293—55)

The invention relates generally to protective devices for automotive vehicles and more particularly to bumpers and parts adapted to be attached to bumpers to protect the radiator grille, the fenders, the trunk and the like.

A general object of the invention is to provide bumpers and attachments of new and improved construction and appearance.

A more particular object of the invention is to provide bumpers or attachments which are of sturdy and rugged construction yet present and maintain an attractive appearance and may be economically manufactured.

Another object is to perfect bumpers or attachments therefor which are in part or in whole encased in a covering of some rust-proof, non-tarnishable and wear resisting material, such as stainless steel.

Yet another object is to perfect a bumper or attachment to be mounted on the bumper having a core or frame of steel and a covering, for part or all of the bumper or attachment, of stainless steel applied in a secure yet economical manner to result in a bumper or attachment of lower manufacturing cost than a plated or bonded bumper or attachment of equal quality.

Other objects and advantages will become apparent from the following detailed description taken in connection with the accompanying drawings, in which:

Fig. 1 is a front elevational view of the protective devices embodying features of the invention, shown applied to the forward end of an automotive vehicle.

Fig. 2 is a sectional view taken along the line 2—2 of Fig. 1 and enlarged particularly to show details of construction.

Fig. 3 is a sectional view taken approximately along the line 3—3 of Fig. 1 and again enlarged better to show the details of constructions.

Fig. 4 is a fragmentary front elevational view of a modified form of a protective device.

Fig. 5 is a sectional view taken approximately along the line 5—5 of Fig. 4.

Fig. 6 is a fragmentary front elevational view of still another modified form of protective device.

Fig. 7 is a sectional view taken approximately along the line 7—7 of Fig. 6.

Fig. 8 is a fragmentary front elevational view of another modified construction of protective device.

Fig. 9 is a transverse sectional view taken approximately along the line 9—9 of Fig. 8.

Fig. 10 is a fragmentary front elevational view of still another form of protective device.

Fig. 11 is a sectional view taken approximately along the line 11—11 of Fig. 10.

Fig. 12 is a fragmentary front elevational view of yet another form of protective device.

Fig. 13 is a fragmentary front elevational view of a further modified form of construction.

Fig. 14 is a transverse sectional view of the protective device shown in Fig. 13, illustrating an intermediate step in the manufacture of the device.

Fig. 15 is a sectional view taken approximately along the line 15—15 of Fig. 13.

While the invention is susceptible of various modifications and alternative constructions and is herein disclosed in a plurality of such modifications, it is not intended that the invention is to be limited thereby to the constructions disclosed or that the disclosure represents all of the modifications, but it is intended to cover all modifications and alternative constructions falling within the spirit and scope of the invention as defined by the appended claims.

Referring now more particularly to Figs. 1 to 3 of the drawings, 20 represents generally a horizontally disposed bumper bar secured to the forward end of an automotive vehicle. Mounted centrally of the bumper bar 20 and upstanding therefrom in a vertical plane is a radiator grille guard generally designated 21, and secured beneath the bumper bar 20 is a drop bar or guard generally designated 22. Mounted on the bumper bar 20, on either side of the grille guard 21, are similar guards 23 and drop bars 24 for protecting the fenders. These guards and drop bars are of the same construction as the guard and the drop bar 22 but are of a smaller size.

The bumper bar 20 is herein shown, by way of example, as being of channel shape in cross section (see Fig. 3), though it is to be understood, of course, that this shape may be varied. The guard 21 is herein shown as made of flat stock and comprises an upstanding main or body portion 25 and means for securing the body portion to the bumper bar 20. The main body portion 25 is of inverted V-shape and may be formed of two pieces riveted together at the apex of the inverted V or, preferably, of a single piece of stock bent intermediate its ends to form the V-shape. Each of the legs of the main body portion terminates at its free end in a vertical portion 26 a part of which has its edges rounded and threaded, as at 27, to receive a nut 28. For securing the guard to the bumper bar 20, each leg thereof is formed with a hooked finger 29 adapted to engage over the upper edge of the bumper bar 20. Preferably, this upper finger constitutes an integral part of the main portion 25 and to that end is formed by stamping the same out of the strip forming the main body portion. A lower or complementary finger adapted to engage over the lower edge of the bumper bar 20 is herein formed as a separable part having an aperture formed in its inner end so that it may be slid over the threaded portion 27 and secured by the nut 28 with the bumper bar clamped tightly between the finger 29 and 30.

The drop bar 22 comprises a rectangular bar 33 secured as by a rivet 34 to the vertical arm 35 of an angle bracket generally designated 36. The horizontal arm 37 of the angle bracket has an aperture formed therein adapting the bracket to be mounted over the threaded portion 27 of the guard beneath the finger 30 where it is rigidly secured by the nut 28. It is believed apparent that with this construction of the drop bar the same may or may not be used in conjunction with the guard 21. If it is used, it is easily attached and appears as an integral part of the guard, but when not used the guard does not appear incomplete.

Protective devices such as the bumper and guards disclosed herein are usually plated in order that they may have a shiny and attractive appearance, and also in order to prevent the device from becoming rusty and tarnished. Such plating of the protective device is, however, expensive and, moreover, upon being scratched or bent the plating may come off with resultant disfigurement of the device and eventual rusting and tarnishing. It is a feature of this invention, therefore, to perfect protective devices which are more economically manufactured than the devices heretofore employed, yet which present a neat appearance and which, moreover, are not as readily scratched or marred to the extent that there will be an unsightly disfigurement of the device or that the steel forming the core of the device will be exposed and subject to rusting.

To that end, each of the devices is sheathed in whole or in part by a covering of rust-proof and nontarnishing material attached in a secure but economical manner. In the form of the invention shown in Figs. 1 to 3, this covering is in the nature of a veneer and comprises a very thin sheet of rust-proof and non-tarnishing metal, preferably stainless steel. In the case of the bumper bar 20, this covering of stainless steel, designated 39, is given a channel shape conforming to the shape of the bar 20 and covering the front face and the upper and lower edges of the bar 20. The covering is secured by a strip of rubber 40 which has embedded therein at suitably spaced intervals the head of a bolt 41 which is adapted to project through apertures formed in the bar 20 and retained by a nut 42 threaded on the inner and concealed end of the bolt. The rubber strip 40 preferably is narrower than the bumper bar 20 in order that the stainless steel may be exposed about the strip, thereby enhancing the appearance of the bumper bar due to the contrast between the stainless steel and the rubber strip. In addition to enhancing the beauty of the bar and also serving as a means for securely retaining the stainless steel covering on the bar, the rubber strip 40 acts as a buffer and cushion absorbing the initial shocks of contact with another bumper or the like, and also tending to prevent scratching and marring of the bumper by preventing actual engagement of the bumper with the object contacted.

It is to be understood that the drop bars and the guards are similarly protected by a covering of stainless steel. In the case of the guards, the stainless steel covering 39' is again given a channel shape, conforming to the strip from which the guard is formed and covering the front face and the edges of the guard. While the covering 39' could be formed as a single piece, it is, for convenience in manufacture, formed in two pieces (see Fig. 1) each covering one leg of the body portion. The covering for each leg is secured by a rubber strip 40' having the head of a bolt 41' embedded therein and extending through apertures in the guard to be secured by a nut 42'. The fingers 29 may also be covered with a coating of stainless steel or may be covered in some other manner for purposes of contrast.

Referring now particularly to Figs. 4 and 5, there is disclosed in those figures a modified form of the invention showing a different type and manner of covering for the core of a protective device. The new form of covering is shown in conjunction with a guard, but it is to be understood of course that it is equally applicable to other forms of protective devices, particularly a bumper. Accordingly, there is disclosed in the figures a bumper bar 45 upon which a guard generally designated 46 is shown mounted. This guard is generally similar in construction to that disclosed in Figs. 1 to 3 and, accordingly, has a core made of flat-stock metal 47 having a rectangular cross section, as best seen in Fig. 5. Mounted over each edge of the core 47 is a covering 48 of stainless steel formed in channel shape so as to be received snugly over the edges of the core. These channel shaped coverings 48 extend from a point beneath the upper edge of the bar 45 to the curved apex or point of the guard 46, as clearly seen in Fig. 4. Mounted over the front face of the guard 46 is a rubber covering 49 having a central portion 50 and two legs 51. These leg portions are wide enough to overlap the side walls of the channel shaped stainless steel coverings 48 (see Fig. 5), but narrower than the core 47 in order that a border of stainless steel remain so as to enhance the attractiveness of the guard. The portion 50 intermediate the legs 51 overlies the entire core 47 in order to give protection thereto and to facilitate manufacture. The rubber covering 49 is secured and the stainless steel covering 48 is also secured by means of a plurality of bolts 52 spaced longitudinally of the legs 51 of rubber. Each of the bolts 52 has its head embedded in the rubber near one edge thereof and passes through the core 47 and also the side walls of the channel shaped steel coverings 48. A nut 53 is threaded on the inner free end of the bolt and tightened so as to secure the stainless steel and also the rubber covering by tightening of the nut 53 onto the bolt. This form of the invention has the advantage that a smaller quantity of stainless steel is required, which is more expensive than rubber.

Referring to Figs. 6 and 7, there is disclosed in those figures a further modified construction. In this form of the invention the rubber covering is used to the exclusion of a stainless steel covering. To that end the covering is again shown in conjunction with a guard having a core of flat-stock metal 55. Secured to the core 55 is a rubber covering 56 which herein is retained on the core by means of a cement 57. As seen in Figs. 6 and 7, the rubber covering 56 is again made somewhat narrower than the core 55 in order that there may be a border of contrasting appearance to add to the appearance of the grille guard or other protective device. Here again, while the covering is illustrated as applied to a guard, it is to be understood that other protective devices, such as the bumper 20 and the drop bar 33, may have a similar covering.

Figs. 8 and 9 disclose still a further modified covering and means of attaching the same to the protective device. In this form of the invention, the rubber covering or securing means has been dispensed with and the metal core 58 of the guard is sheathed entirely in stainless steel. Thus, as best seen in Fig. 9, the core 58 is sheathed in a veneer-like, stainless steel covering 59 which overlies the front face and the edges of the core 58 and is secured to the core by having flanges 60 which are bent inwardly to engage the rear face of the core 58. This is a very desirable construction because the stainless steel covering 59 is so readily applied and there are a minimum number of parts and retaining means. Moreover, with this construction, at least a portion of the back face is concealed and a tight fit of the veneer-like covering is assured.

Figs. 10 and 11 disclose still a further modification of the invention. In the form disclosed in Figs. 10 and 11, the core 63 of the guard is shown as composed of round stock, though it is to be appreciated that that is for purposes of disclosure only and that the flat stock of Figs. 1 to 9 could be used equally well. As best seen in Fig. 10, the core 63 is encased in a stainless steel covering which herein is composed of a narrow strip 64 of stainless steel wound in spiral fashion about the core 63. This stainless steel strip 64 is applied to the core 63, while still straight, and thus is readily applied simply by winding the same onto the core while the same is being rotated in a lathe or the like. It is believed apparent that this strip 64 may be wound in a variety of ways, that is, either with a slight overlap, as shown in Fig. 10, or with a space between adjacent turns which could be taken advantage of to produce contrasting colors to enhance the appearance of the guard. Preferably, to secure the strip 64, each end is secured by a pin 65 extending through the end of the strip and into the core 63. After the core 63 has been wound with the stainless steel strip, it is bent to give it the desired triangular shape. Depending upon the sharpness of the bend forming the apex of the triangle, as well as upon the extent of overlap between adjacent turns of the strip 64, the core 63 may or may not become exposed due to the shifting of the strip as an incident to the bending of the core. To conceal such exposure of the core, as well as serving generally to enhance the appearance of the guard, an ornament generally designated 66 is provided for attachment at the apex of the triangle. This ornament consists of a rubber disk 67 which may be molded to represent a flower or the like, two bolts 68 which project through the disk 67 on either side of the core 63, and a yoke 69 which has apertures to receive the bolts 68 and which is retained on the bolts for clamping the ornament to the core by means of nuts 70.

Preferably the round stock core 63 is upset to form lugs 71 providing an abutment for an upper finger 72. With the use of round stock for the guard, the finger 72 no longer is made integral with the main portion of the guard as is the finger 29 of the guard shown in Figs. 1 to 3, but on the contrary is formed as a separate finger similar to the finger 30 of the form of the invention shown in Figs. 1 to 3. Accordingly, the finger 72 has its inner end apertured so that the finger may be slid over the core 63 into abutment with the lugs 71 which then prevent further upward movement of the finger 72.

In Fig. 12, a modified form of the invention is disclosed, again employing, for purposes of illustration, a guard having a core 63' of round stock. Because of the formation of the core of round stock, a finger 72', similar to the finger 72 of Fig. 10, is employed and preferably lugs 71' are again provided to form an abutment limiting the upward movement of the finger. In this form of the invention the covering, however, takes the form of a wire 73 wound in a spiral about the core 63'. This covering is again applied while the core 63' is still in the form of a straight bar, and thus is readily applied. To facilitate winding, as well as to assure that the wire will not become unwound, an aperture 74 is drilled in each leg of the guard between the lugs 71', through the core 63', into which an end of the wire 73 is inserted. It is believed apparent that, as in the case of the form of the invention shown in Figs. 10 and 11, the wire 73 may be wound close, as shown in Fig. 12, or may be wound so as to leave space between adjacent turns of the wire. In the latter case, the core 63' could be painted some contrasting color with the result that the spaced winding of the wire 73 would produce a very striking effect.

Though lugs 71' are disclosed herein, and though they are preferably provided, it is permissible to eliminate the lugs and rely upon the shoulder formed by the wire 73 as an abutment preventing upward movement of the finger 72'. This form of the invention is in many respects a preferred form in that it is so readily and economically manufactured and because of the irregular surface provided does not show scratches and mars as much as plain surface coverings. For the latter reason, though of course a stainless steel wire is preferred, some other cheaper form of wire may be employed with satisfactory results.

Figs. 13 to 15 disclose still another modified form of construction in which the guard has a core 63'' of round stock. In this form of the invention, the core is completely sheathed in a covering of rust-proof and non-tarnishable metal, preferably stainless steel. Accordingly, the covering comprises a thin sheet 75 of stainless steel which has a width equal to the circumference of the core 63'' and is applied by wrapping the same about the core with the edges of the sheet in abutment, as at 76. Preferably, the covering 75 is so applied that the joint 76 lies at the rear of the core 63''. This has the dual advantage of effectively concealing the joint when the guard is mounted on the automotive vehicle and of minimizing the tendency toward separation of the joint when the core is formed into the inverted V-shape of the guard, since here again the covering is applied while the bar is still straight.

While the forms of the invention disclosed in Figs. 4 to 15 have been particularly described with respect to a radiator grille or fender guard, it is not intended that the invention is to be limited to use on that particular device, but it is intended and is believed readily understood that the constructions disclosed and described in those figures are equally applicable to bumper bars and drop bars or guards. It is believed apparent from the foregoing that I have perfected a construction for protective devices to be employed on automotive vehicles which have numerous advantages over protective devices now employed. With my invention, a protective device may be produced which has all and more of the neatness and attractive appearance of a plated device, and yet will not be subject to chipping off of the plating and the corrosion which experience has proved still takes place in plated protective devices. At the same time, protective devices constructed in the manner of my invention have all of the advantages of a protective device formed entirely of some stainless metal and, of course, are much more economically manufactured than such devices. My invention has the additional advantage that protective devices constructed in accordance therewith may be arranged to have contrasting colors to heighten the attractiveness of the devices and may also be so constructed as to cushion the shock of initial contact, or present such surfaces that scratches do not show so readily.

I claim as my invention:

1. In a protective device for an automotive vehicle, a flat-stock bar of dull metal subject to corrosion forming the core of the protective device, a veneer-like, channel shaped stainless steel covering applied over the edges only of said bar to provide a bright non-corrosive finish to those surfaces of said bar while leaving a strip intermediate the edges uncovered, and means for securing said stainless steel covering to said bar comprising a strip of rubber extending longitudinally of the bar, said strip being narrower than the bar to leave a border of stainless steel but wider than the uncovered strip of the bar to overlap said stainless steel covering, a plurality of bolts spaced longitudinally of each edge of the strip of rubber each having its head embedded in said rubber strip and each projecting through an aperture formed in said stainless steel covering and in said bar, and a nut for securing each of said bolts.

2. A radiator grille or fender guard adapted for attachment to the bumper bar of an automotive vehicle comprising a main portion of inverted V-shape adapted to extend upwardly from the bumper bar, means for removably attaching said main portion securely to the bumper bar in upright position, said main portion being formed of a bar of round stock metal capable of withstanding the strains to which the guard is subjected, and a covering for the main portion comprising a round wire having a non-tarnishable surface wound spirally about the round stock forming said main portion, said main portion having an aperture near the base of each leg portion into which an end of the wire wound about the main portion is inserted to secure the end of the wire.

3. In a protective device for an automotive vehicle, a metallic bar shaped to form the backbone of the protective device, and a covering for said bar comprising a round wire having a non-tarnishable surface wound in spiral fashion about said bar, said bar having apertures formed therein into which the ends of the wire are inserted to secure the ends of the wire against unwinding.

4. An auxiliary attachment for a bumper bar or the like comprising a main portion adapted to project above the bar laterally thereof, a depending portion formed integral with said main portion adapted to be disposed behind and against the bumper bar, said depending portion having its free end threaded, a hook formed integrally with said main portion projecting laterally of the plane of the attachment and adapted to engage over the upper edge of a bumper bar to which the attachment is applied, a separable hook apertured to receive the threaded end of the depending portion of the attachment and adapted to engage over the lower edge of a bumper bar to which the attachment is applied, and a nut threaded onto said integral depending portion for retaining said last mentioned hook on the depending portion with the bumper bar clamped firmly between it and the first mentioned hook.

5. An auxiliary attachment for a bumper bar or the like of an automotive vehicle comprising a first part having a portion of inverted V-shape adapted to extend laterally above a bumper bar to which the attachment is applied and means for clamping said part to the bumper bar including a laterally projecting finger adapted to engage the lower edge of the bumper bar, and a second part adapted to extend below the bumper bar comprising a right angle bracket having a horizontal leg adapted to be secured to the securing means of said first part beneath and parallel to said finger, and a vertical leg extending downwardly, and a horizontally disposed bar supported on the vertical leg of said bracket.

6. An auxiliary attachment for a bumper bar or the like comprising a first part having a main portion of inverted V-shape adapted to project laterally above the bumper bar to which the attachment is applied, each leg of the inverted V-shaped main portion terminating in a vertical depending portion formed integral therewith and adapted to be disposed behind the bumper bar, each of said depending portions being threaded, securing means for said part at each of the depending portions comprising a first hook-shaped finger engaging the depending portion and adapted to engage over the upper edge of the bumper bar, a second hook-shaped finger complementary to said first finger adapted to engage over the lower edge of the bumper bar, said last named finger having an aperture formed therein adapting the same to receive therethrough the depending portion, and a nut for securing said last named finger on said depending portion to clamp the bumper bar between said fingers, and a part adapted to project beneath the bumper bar comprising a pair of brackets each having a horizontal arm adapted to be clamped between the second finger and the nut of said first part and a vertical arm, and a horizontally disposed bar supported by said vertical arms of the brackets.

7. An auxiliary protective device for attachment to the bumper bar of an automotive vehicle comprising a main portion adapted to extend upwardly from the bumper bar and formed of tarnishable metal stock capable of withstanding the strains to which the device is subjected, means for removably attaching said main portion securely to the bumper bar in upright position, and a protective covering for the stock of the main portion to add strength and lend beauty comprising non-tarnishing metal round wire wound in spiral manner about the stock forming the main portion of the device, the successive turns being in tight contact to form a complete covering and secured to said bar only at the ends of said wire.

EDWIN BAGNALL.